(12) United States Patent
Ogawa et al.

(10) Patent No.: US 12,739,113 B2
(45) Date of Patent: Sep. 15, 2026

(54) NETWORK STORAGE FOR PROCESSING CRYPTOGRAPHIC FILES WHILE KEEPING PRIVATE KEY SECRET IN KEY TERMINAL

(71) Applicant: Passlogy Co., Ltd., Tokyo (JP)

(72) Inventors: Hideharu Ogawa, Tokyo (JP); Takeo Suzuki, Tokyo (JP)

(73) Assignee: Passlogy Co., Ltd., Tokyo (JP)

( * ) Notice: Subject to any disclaimer, the term of this patent is extended or adjusted under 35 U.S.C. 154(b) by 22 days.

(21) Appl. No.: 19/099,728

(22) PCT Filed: Jul. 29, 2022

(86) PCT No.: PCT/JP2022/029351
§ 371 (c)(1),
(2) Date: Jan. 29, 2025

(87) PCT Pub. No.: WO2024/024103
PCT Pub. Date: Feb. 1, 2024

(65) Prior Publication Data

US 2026/0031985 A1 Jan. 29, 2026

(51) Int. Cl.
*H04L 9/08* (2006.01)

(52) U.S. Cl.
CPC ............ *H04L 9/088* (2013.01); *H04L 9/0866* (2013.01); *H04L 9/0894* (2013.01)

(58) Field of Classification Search
CPC ..... H04L 9/088; H04L 9/0866; H04L 9/0894; H04L 9/0825; H04L 2209/76
See application file for complete search history.

(56) References Cited

U.S. PATENT DOCUMENTS 6,834,112 B1 * 12/2004 Brickell ................ H04L 9/3236
380/279
11,451,523 B2 * 9/2022 Rawalkshatriya ...... H04L 63/06
(Continued)

FOREIGN PATENT DOCUMENTS

EP 2704354 A1 3/2014
EP 2955900 A1 12/2015
(Continued)

OTHER PUBLICATIONS

International Search Report and Written Opinion, mailed Sep. 6, 2022, for International Application Serial No. PCT/JP2022/029351 filed on Jul. 29, 2022.
(Continued)

*Primary Examiner* — Michael R Vaughan
(74) *Attorney, Agent, or Firm* — K&L Gates LLP; Brian J. Novak; Giorgios N. Kefallinos

(57) ABSTRACT

In a storage system (101), a key terminal (141) secretly records a primary private key included together with a primary public key in a primary key pair. An upload terminal (111) encrypts an object file into an encrypted file with a generated common key, encrypts the common key into a first cipher with the primary public key, and stores the encrypted file and the first cipher in a storage server (131). A download terminal (121) generates a temporary key pair including a temporary public key and a temporary private key, secretly records the temporary private key, transmits the temporary public key to the key terminal (141), and signs in to the storage server (131). Then, the key terminal (141) and the storage server (131) in cooperation with each other generate a second cipher acquired by encrypting the common key with the temporary public key while the common key is kept secret from the storage server (131), and transmit the second cipher to the download terminal (121). The download terminal (121) decrypts the shared key from the second cipher
(Continued)

with the temporary private key, and decrypts, with the common key, the object file from the encrypted file acquired from the storage server (131).

12 Claims, 4 Drawing Sheets

(56) References Cited

U.S. PATENT DOCUMENTS

| | | | | |
|---|---|---|---|---|
| 2011/0103589 | A1* | 5/2011 | Tie | H04L 9/083<br>380/282 |
| 2014/0050318 | A1* | 2/2014 | Hayashi | H04L 9/3073<br>380/46 |
| 2017/0359314 | A1* | 12/2017 | Mathias | H04L 67/06 |
| 2021/0089676 | A1* | 3/2021 | Ford | H04L 9/0825 |
| 2022/0052841 | A1* | 2/2022 | Fukuda | H04L 9/3231 |
| 2026/0037646 | A1* | 2/2026 | Doyle | G06F 21/602 |

FOREIGN PATENT DOCUMENTS

| | | | | |
|---|---|---|---|---|
| EP | 3053317 | B1 * | 6/2018 | H04W 12/068 |
| JP | 2011054028 | A * | 3/2011 | |
| JP | 2014-507841 | A | 3/2014 | |
| JP | 2014-209780 | A | 11/2014 | |
| JP | 2018-142922 | A | 9/2018 | |
| JP | 2019-102970 | A | 6/2019 | |
| WO | WO-2012050980 | A2 * | 4/2012 | F16M 11/105 |
| WO | WO-2015074745 | A1 * | 5/2015 | H04L 63/045 |
| WO | 2024/024103 | A1 | 2/2024 | |

OTHER PUBLICATIONS

Notice of Reasons for Refusal (Office Action), drafted Aug. 26, 2024, for Japanese Patent Application Serial No. 2023-207412. (Original and English Translation enclosed).

Chow et al., Efficient Unidirectional Proxy Re-Encryption. Progress in Cryptology—AFRICACRYPT 2010: Third International Conference on Cryptology in Africa, Stellenbosch, South Africa, May 3-6: Proceedings. vol. 6055, pp. 316-332.Research Collection School Of Information Systems. (2010) (https://ink.library.smu.edu.sg/sis_research/1316), May 2010.

Extended European Search Report (EESR) dated Apr. 23, 2026, issued for the corresponding EP patent application No. 22953191.8, 9 pages.

* cited by examiner

NETWORK STORAGE FOR PROCESSING CRYPTOGRAPHIC FILES WHILE KEEPING PRIVATE KEY SECRET IN KEY TERMINAL

CROSS REFERENCE TO RELATED APPLICATION(S)

This application is a national phase filing of International Application Serial No. PCT/JP2022/029351, filed on Jul. 29, 2022, the entire disclosure of which is incorporated herein by reference.

TECHNICAL FIELD

The present disclosure relates to a network storage for processing an encrypted file while a private key is kept secret in a key terminal.

BACKGROUND ART

A network storage (may also be referred to as online storage or cloud storage) service that backs up an object file owned by a user into a storage server, allows the object file to be restored later, and allows the object file to be transmitted to another user is provided (for example, see Patent Literature 1).

In the network storage service, when the object file is encrypted into an encrypted file and stored in the storage server, a person who does not know a key for decryption cannot obtain the object file.

Herein, a public key encryption technique can be used in encryption of a file. In the public key encryption technique, a key pair including a private key and a public key is generated for a user. The public key is a key used for encryption of a file, and can be opened to another user. The private key is a key used for decryption of a file, and needs to be secretly managed by the user.

In the public key encryption technique, a proxy re-encryption technique that can create an encrypted file B being encrypted, with a public key of a user Y, from an encrypted file A being encrypted with a public key of a certain user X while a user other than the user X and the user Y does not obtain a private key of the user X and the user Y is also studied. Information for converting the encrypted file A into the encrypted file B is also referred to as a proxy key (for example, see Non Patent Literature 1).

When a cipher is used in the network storage service, an apparatus (upload terminal) for encrypting an object file and uploading the object file into the storage server and an apparatus (download terminal) for downloading the encrypted file from the storage server and decrypting the encrypted file are used.

CITATION LIST

Patent Literature

Patent Literature 1: Unexamined Japanese Patent Application Publication (Translation of PCT Application) No. 2014-507841

Non Patent Literature

Non Patent Literature 1: Sherman S. M. CHOW, Weng JIAN, Yanjiang YANG, and Robert H. DENG. (2010). Efficient unidirectional proxy reencryption. Progress in Cryptology—AFRICACRYPT 2010: Third International Conference on Cryptology in Africa, Stellenbosch, South Africa, May 3-6: Proceedings. vol. 6055, pp. 316-332. Research Collection School Of Information Systems. (https://ink.library.smu.edu.sg/sis_research/1316). May, 2010

SUMMARY OF INVENTION

Technical Problem

In the public key encryption technique and the proxy re-encryption, management of a private key is extremely important. Then, a technique is strongly desired in which a user prepares an apparatus (key terminal) for secretly managing a private key separately from the apparatuses described above and facilitates management of a private key, and processing such as encryption, decryption, and re-encryption of a file can also be performed while a private key stored in the key terminal is never transmitted to a computer communication network and is not obtained by any of the storage server, the upload terminal, and the download terminal.

The present disclosure is to solve the problems as described above, and has an objective to provide a storage system for processing an encrypted file while a private key is kept secret in a key terminal.

Solution to Problem

A storage system of the present disclosure may be configured as a storage system comprising:

an upload terminal;

a download terminal;

a storage server; and a key terminal that secretly records a primary private key included together with a primary public key in a primary key pair, wherein (a) the upload terminal generates a common key, generates an encrypted file by encrypting an object file with the generated common key, generates a first cipher by encrypting the generated common key with the primary public key, and stores the generated encrypted file and the generated first cipher in the storage server, (b) the download terminal generates a temporary key pair including a temporary public key and a temporary private key, secretly records the temporary private key, transmits the temporary public key to the key terminal, and attempts a sign-in to the storage server, (c) when the sign-in is successful, the key terminal and the storage server in cooperation with each other generate a second cipher acquired by encrypting the common key with the temporary public key from the recorded primary private key, the transmitted temporary public key, and the stored first cipher while the common key is kept secret from the storage server, and transmit the generated second cipher to the download terminal, and (e) the download terminal decrypts the shared key from the transmitted second cipher with the temporary private key, acquires the stored encrypted file from the storage server, and decrypts the object file from the acquired encrypted file with the decrypted common key.

In the storage system of the present disclosure, it may be configured that the key terminal generates a proxy key from the recorded primary private key and the transmitted temporary public key, and transmits the generated proxy key to the storage server, and the storage server generates the second cipher by reencrypting the stored first cipher with the transmitted proxy key, and transmits the generated second cipher to the download terminal.

In the storage system of the present disclosure, it may be configured that the key terminal acquires the stored first cipher from the storage server, decrypts the shared key from the first cipher with the recorded primary private key, generates the second cipher by encrypting the decrypted shared key with the transmitted temporary public key, and transmits the generated second cipher to the download terminal via the storage server.

Advantageous Effects of Invention

The present disclosure can provide a storage system for processing an encrypted file while a private key is kept secret in a key terminal.

DESCRIPTION OF EMBODIMENTS

Embodiments according to the present disclosure are described below. Note that the present embodiment is used for description, and does not limit the scope of the present disclosure. Therefore, a person skilled in the art can adopt an embodiment in which each element or all elements of the embodiments are replaced with equivalent elements, but the embodiments are also included in the scope of the present disclosure.

(Basic Configuration)

Figure 1:
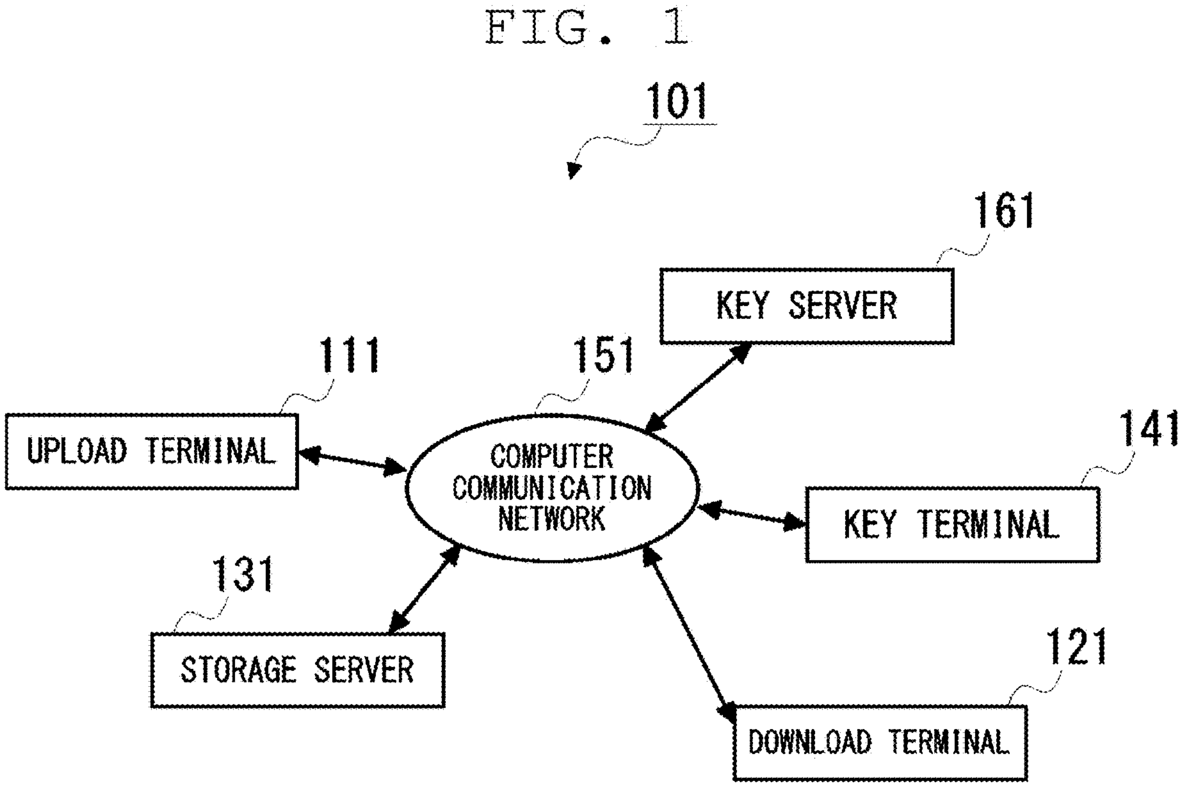
FIG. 1 is an explanatory diagram illustrating a configuration of a storage system according to one embodiment of the present disclosure.

FIG. 1 is an explanatory diagram illustrating a configuration of a storage system according to one embodiment of the present disclosure. Hereinafter, a description is given with reference to FIG. 1.

A storage system 101 according to the present embodiment includes an upload terminal 111, a download terminal 121, a storage server 131, and a key terminal 141. Further, a key server 161 can be provided as an omittable element. The apparatuses are communicably connected to one another via a computer communication network 151. The storage system 101 provides a so-called network storage service.

In the present storage system, a file uploaded by the upload terminal 111 is downloaded by the download terminal 121.

The upload terminal 111 and the download terminal 121 may be achieved by the same computer, or may be achieved by different computers. Further, an upload user who uses the upload terminal 111 and a download user who uses the download terminal 121 may be the same or may be different.

When the upload user and the download user are the same, the present storage system 101 can be used for file backup. In other words, a file being backed up by the upload terminal 111 can be restored by the download terminal 121.

When the upload terminal 111 and the download terminal 121 are achieved by different computers and when an upload user and a download user are different, the storage system 101 can be used for transmission/reception of a file between different users or between different computers. In other words, a file can be transmitted from the upload terminal 111 to the download terminal 121.

In the present embodiment, the key terminal 141 achieves processing based on a public key encryption technique, and is used by a download user. Herein, a primary key pair including a primary private key and a primary public key is assigned to the download user. In other words, the download user is a key owner who owns the primary key pair.

The key terminal 141 secretly records the primary private key. In the present embodiment, the primary private key never leaks to the outside of the key terminal 141. In other words, in the present embodiment, the upload terminal 111, the download terminal 121, and the storage server 131 never obtain the primary private key, and proceed with the processing of backing up/restoring a file and transmitting a file described above.

When there is an inquiry designating an identification name of a user, the key server 161 makes a reply designating a public key assigned to the user, based on information registered in a database. In the present embodiment, the primary public key assigned to the download user is registered in the key server 161, and the upload terminal 111, the download terminal 121, and the storage server 131 can obtain the primary public key of the download user when making an inquiry to the key server 161 by an identification name of the download user.

Note that the storage server 131 and the key server 161 may be configured to be achieved by the same server computer.

In an aspect in which the key server 161 is omitted, the primary public key may be able to be obtained by the upload terminal 111, the download terminal 121, and the storage server 131 via communication by various non-transitory information recording media and various transitory information transmission media.

As the non-transitory information recording medium, a universal serial bus (USB) memory achieved by a solid state disk (SSD) and the like, a compact disk read only memory (CD-ROM), a digital versatile disk ROM (DVD-ROM), and the like can be used.

As the transitory information transmission medium, Bluetooth (registered trademark) communication, near field communication (NFC) communication, wired communication via a universal serial bus (USB) cable, wired communication via a network cable, Wifi communication via a wireless access point, mobile communication via a cellular phone communication network, communication in which information is transmitted by displaying a one-dimensional bar code, a two-dimensional code, a character, and the like on a screen and performing image recognition and character recognition, and the like can be adopted.

As an identification name of a user, for example, an e-mail address, an address and a name, a social security number, a tax number, a national identification number, an account name used in various public services and various private services, and the like can be adopted.

The primary key pair is typically generated in the key terminal 141, and the primary private key of the generated primary key pair is secretly recorded in the key terminal 141, and the primary public key is registered in the key server 161.

Note that, as described below, an aspect in which, when there is an inquiry about an unregistered user, the key server 161 generates a provisional key pair including a provisional public key and a provisional private key, registers the provisional key pair in association with the unregistered user in a database, and also makes a reply with the provisional public key can be adopted.

When an unregistered user generates a primary key pair in the key terminal 141 and registers a primary public key in the key server 161, a provisional key pair is transmitted from the key server 161 to the key terminal 141 via a safe communication path. After download processing using the provisional key pair is performed or after a certain period of time has elapsed since the provisional key pair is transmitted to the key terminal 141, it is desirable that the provisional key pair is invalidated, a new primary key pair is generated in the key terminal 141, and a new primary public key is registered in the key server 161.

The download terminal 121 generates a temporary key pair for being temporarily used when a file is downloaded. The generated temporary key pair includes a temporary public key and a temporary private key. The temporary private key is typically used secretly in the download terminal 121. Therefore, in other words, the temporary private key is not obtained by an external apparatus such as the upload terminal 111, the storage server 131, and the key terminal 141.

The upload terminal 111, the download terminal 121, the storage server 131, the key terminal 141, and the key server 161 according to the present embodiment can be achieved by executing a program according to a function on hardware of various computers.

As the upload terminal 111 and the download terminal 121, a desktop computer, a laptop computer, and a tablet computer being used for daily work by a user can be typically used. The computers may be virtualized by a desktop virtualization technique.

As the storage server 131, a large-capacity file server computer that can store a great number of enormous files, and the like can be used.

As the key terminal 141, in addition to a general-purpose computer terminal having excellent portability such as a smartphone and a tablet, a dedicated computer terminal that can achieve processing according to a public key encryption technique and management of a key pair can also be used.

As the key server 161, a web server computer that provides a web application programming interface (API) having a function of making a reply designating a public key of a user when an inquiry designating an identification name of the user is made, a public key server computer conforming to OpenPKSD for opening a public key to the public, based on an OpenPGP technique, and the like can be used.

Computer

A configuration of the computers is described below. In general, a computer reads various programs recorded in a non-transitory information recording medium into a random access memory (RAM) being a temporary recording device, and then executes a command included in the read program by a central processing unit (CPU) or a processor. However, in an architecture in which a read only memory (ROM) and the RAM can be mapped and executed in one memory space, a command included in a program stored in the ROM is directly read and executed by the CPU. The CPU, the processor, or the like cooperates with the RAM and the like, and controls a network interface card (NIC) included in the hardware, a Wifi communication module, a mobile communication module, and an external connection apparatus such as a display, a touch screen, a microphone, a speaker, a headphone, a keyboard, a mouse, a trackpad, a touch panel, a global positioning system (GPS) sensor, a geomagnetic sensor, and a posture sensor.

A program executed by the computer can be recorded in a computer-readable non-transitory information recording medium such as a compact disk, a flexible disk, a hard disk, a magneto-optical disk, a digital video disk, a magnetic tape, an ROM, an electrically erasable programmable ROM (EEPROM), a flash memory, and a semiconductor memory. The information recording medium can be distributed and sold independently of each piece of hardware.

A program for achieving each apparatus can be divided for each function, each divided program can be separately recorded in a plurality of information recording media as appropriate, the plurality of information recording media can be put together into a medium set, and the medium set can be distributed and sold independently of each piece of hardware.

Furthermore, the program described above can also be distributed to each computer from a program distribution server and the like via a temporary transmission medium such as the computer communication network 151, independently of a computer in which the program is executed. For example, when a smartphone is adopted as a computer, a program can be distributed and sold in an application store for smartphones.

Note that the program described above can also be described in a programming language for motion level description of an electronic circuit. In this case, various design drawings such as a wiring diagram and a timing chart of an electronic circuit are generated from the program described above, and an electronic circuit constituting the image processing device described above can be created based on the design drawing. For example, the image processing device described above can be constituted from the program described above on hardware that can be reprogrammed by a field programmable gate array (FPGA) technique, and an electronic circuit dedicated to a specific use can also be constituted by an application specific integrated circuit (ASIC) technique.

Exchange of Information

Figure 2:
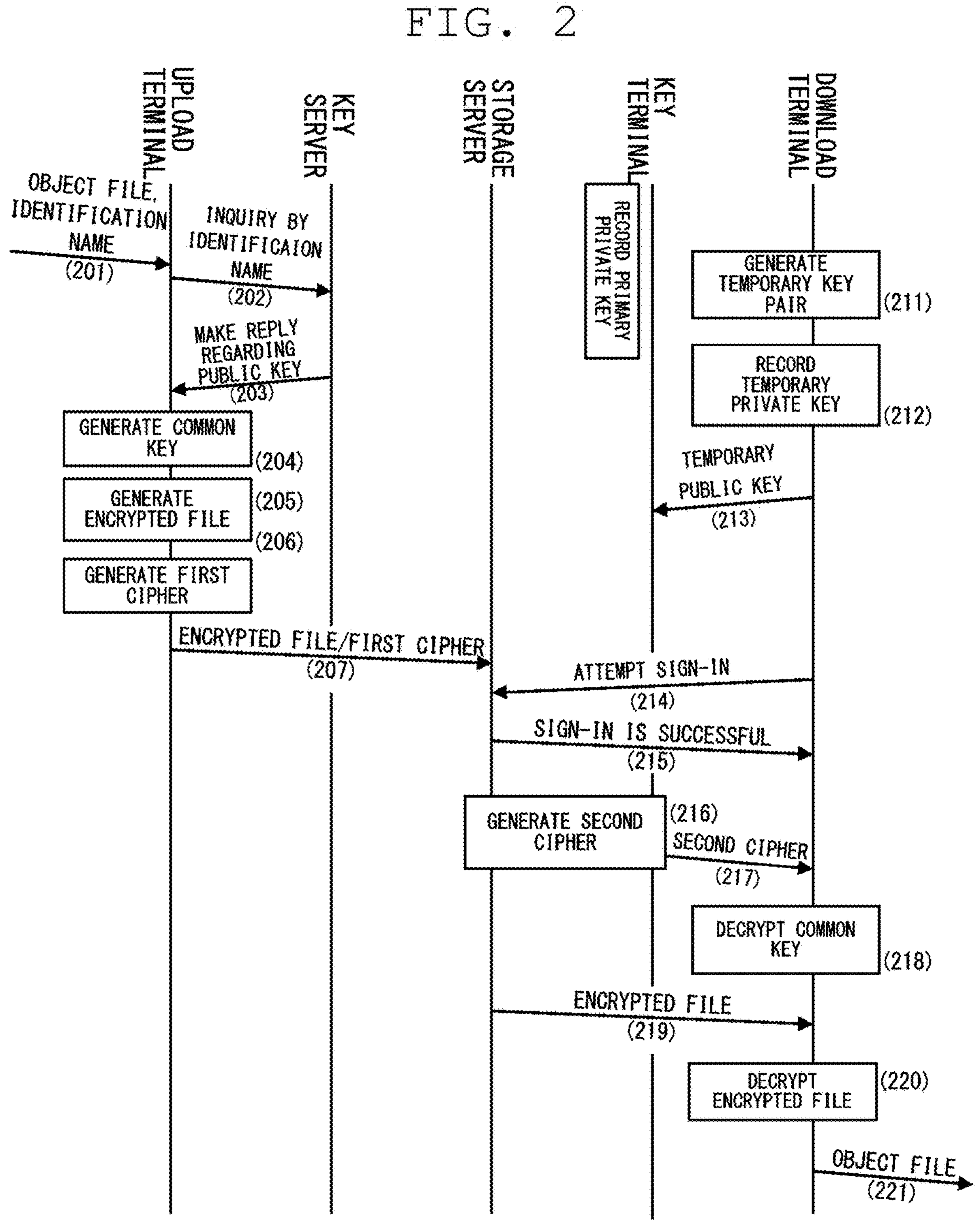
FIG. 2 is an explanatory diagram illustrating a scene of exchange of information in the storage system of the present disclosure.

FIG. 2 is an explanatory diagram illustrating a scene of exchange of information in the storage system of the present disclosure. Hereinafter, a description is given with reference to FIG. 2. Note that FIG. 2 illustrates a scene where information is delivered from a certain apparatus to other apparatus by an arrow. The exchange of information may be performed by transmission and reception of information by communication via the computer communication network

151 and the like between the certain apparatus and the other apparatus, or may be performed by reception of information once from the certain apparatus by one or more different apparatuses other than the certain apparatus and the other apparatus and then delivery of the information to the different apparatus. In the subsequent drawings, a reference sign for an apparatus that performs exchange of information is not illustrated.

In the following description, the key server 161 is also illustrated, but the key server 161 can be omitted appropriately as described above.

In addition, for each piece of processing in the following description, an order of execution can be appropriately changed and the processing can be executed simultaneously within a range in which a dependence relationship of information being a target of the processing is maintained.

Uploading

Hereinafter, uploading of a file is described. The upload terminal 111 determines an object file being a target of backup and delivery, and an identification name of a download user needed to download the object file (201).

An upload user who uses the upload terminal 111 is typically an owner of an object file.

FIG. 2 illustrates that the upload user designates both of the object file and the identification name from the upload terminal 111, but, for example, in a case where a file stored in a specific folder is regularly backed up and the like, the upload user may set his/her identification name in advance in the upload terminal 111, and the set identification name may be determined as an identification name of a download user at the time of backup. Further, the upload terminal 111 may scan a file disposed in the folder, and determine a listed file as an object file.

Next, the upload terminal 111 acquires a public key (primary public key) related to the determined identification name. In FIG. 2, the upload terminal 111 transmits an inquiry designating the determined identification name to the key server 161 (202). When the public key related to the identification name designated in the inquiry is registered in advance, the key server 161 makes a reply designating the public key to the upload terminal 111 (203).

Note that a case where the public key related to the identification name is not registered in the key server 161 is described below.

Further, when the public key (primary public key) of the download user is set in advance in the upload terminal 111 via an information recording medium and the like, exchange with the key server 161 can be omitted.

Then, the upload terminal 111 generates a common key (204), and generates an encrypted file by encrypting the object file with the common key (205).

Herein, the common key is a key used commonly in both ways for generating the encrypted file by encrypting the object file and for generating the original object file by decrypting the encrypted file, and may also be referred to as a symmetric key and a shared key.

Various techniques such as a block encryption technique including IDEA, AES, Camellia, and the like and a stream encryption technique including RC4, FISH, MUGI, and the like can be applied to encryption with the common key.

Herein, for a plurality of object files, the common key may be set common, or may be set differently for each of the object files. Further, a new common key may be generated every time an object file is backed up or delivered, or the same common key may be stored for a certain period, and the stored common key may be continuously used.

It is desirable that the common key is randomly generated and requires a sufficient length.

Then, the upload terminal 111 encrypts the generated common key with the acquired primary public key, and generates a first cipher (206).

Encryption with the primary public key is performed by a public key encryption technique, and various techniques such as RSA encryption, ElGamal encryption, and elliptic curve encryption can be applied.

Then, the upload terminal 111 stores the encrypted file and the first cipher in the storage server 131 (207). In this way, the processing related to uploading of the object file is completed, and the subsequent processing does not need to use the upload terminal 111.

As described above, in the upload terminal 111, the primary public key can be acquired from the key server 161 and the like, and the common key can be generated as necessary, and thus the primary public key and the common key do not need to be maintained and managed in the upload terminal 111. Further, the upload terminal 111 does not need to obtain a private key (primary private key) assigned to the download user.

Downloading

Hereinafter, downloading of a file is described. Note that, as described above, the primary private key of the download user is secretly recorded in the key terminal 141, and the upload terminal 111, the download terminal 121, and the storage server 131 do not need to obtain the primary private key in order to proceed with the processing.

First, the download terminal 121 generates a temporary key pair including a temporary public key and a temporary private key (211), secretly records the temporary private key in the download terminal 121 (212), transmits the temporary public key to the key terminal 141 (213), and attempts a sign-in to the storage server 131 (214).

The temporary key pair generated herein may be set by the same public key encryption system as that of the primary key pair assigned to the download user, or may be set by a different public key encryption system.

The temporary key pair is temporarily used in the download terminal 121, and may be generated every time downloading is performed, or may be stored and maintained for a certain period.

An identification name of the download user is typically transmitted from the download terminal 121 to the storage server 131 by attempting the sign-in, but, in the embodiment of the present disclosure in which a sign-in state is maintained for a certain period by using a session ID, the storage server 131 may be able to obtain an identification name of the download user by transmitting the session ID from the download terminal 121 to the storage server 131.

In an attempt at the sign-in, the download terminal 121 may transmit the temporary public key to the storage server 131 in response to the sign-in. In this aspect, the temporary public key can be indirectly transmitted from the download terminal 121 to the key terminal 141 via the storage server 131.

Note that whether the sign-in is successful can be determined by multi-factor authentication in which use of the key terminal 141 is one of factors. In this aspect, in an attempt at the sign-in from the download terminal 121, a predetermined application program needs to be activated in the key terminal 141. Therefore, the storage server 131 determines whether the application program is activated in the key terminal 141, and transmits the temporary public key to the application program when the application program is activated.

In addition, the download terminal 121 displays the temporary public key as character information as it is on a screen, or encodes the temporary public key into a screen displayable and machine recognizable code such as various one-dimensional bar codes and two-dimensional bar codes, and displays the code on the screen, and then the key terminal 141 performs scanning and machine recognition on information displayed on the screen, and thus the download terminal 121 may transmit the temporary public key.

Whether the sign-in is enabled by the multi-factor authentication can also be determined by using this aspect with the aspect described above.

In other words, the key terminal 141 reports the temporary public key subjected to machine recognition to the storage server 131.

The storage server 131 sets, as a necessary condition for success in the sign-in, a fact that the temporary public key transmitted from the download terminal 121 in response to the attempt at the sign-in and the temporary public key reported from the key terminal 141 coincide with each other.

At this time, furthermore, an electronic signature may be provided to the temporary public key subjected to machine recognition by using the primary private key recorded in the key terminal 141, and then the temporary public key may be reported together with the electronic signature to the storage server 131.

The storage server 131 verifies the reported electronic signature with the primary public key, and sets success in the verification as a necessary condition for success in the sign-in.

In addition, the temporary public key can also be transmitted from the download terminal 121 to the key terminal 141 by Bluetooth (registered trademark) communication, near field communication (NFC) communication, wired communication via a universal serial bus (USB) cable, wired communication via a network cable, Wifi communication via a wireless access point, mobile communication via a cellular phone communication network, and the like.

When the sign-in is successful (215), the key terminal 141 and the storage server 131 cooperate with each other, generate a second cipher (216), and transmit the generated second cipher to the download terminal 121 (217).

Herein, the second cipher corresponds to a cipher acquired by encrypting the common key with the temporary public key. Further, the second cipher is generated from the primary private key recorded in the key terminal 141, the temporary public key transmitted from the download terminal 121, and the stored first cipher.

Herein, in the present embodiment, the common key needs to be kept secret from the storage server 131 in generation of the second cipher. With such a configuration, safety of a file is improved by preventing even a manager of the storage server 131 from being able to decrypt an encrypted file. As a technique for generating such a second cipher, the following techniques are possible.

Figure 3:
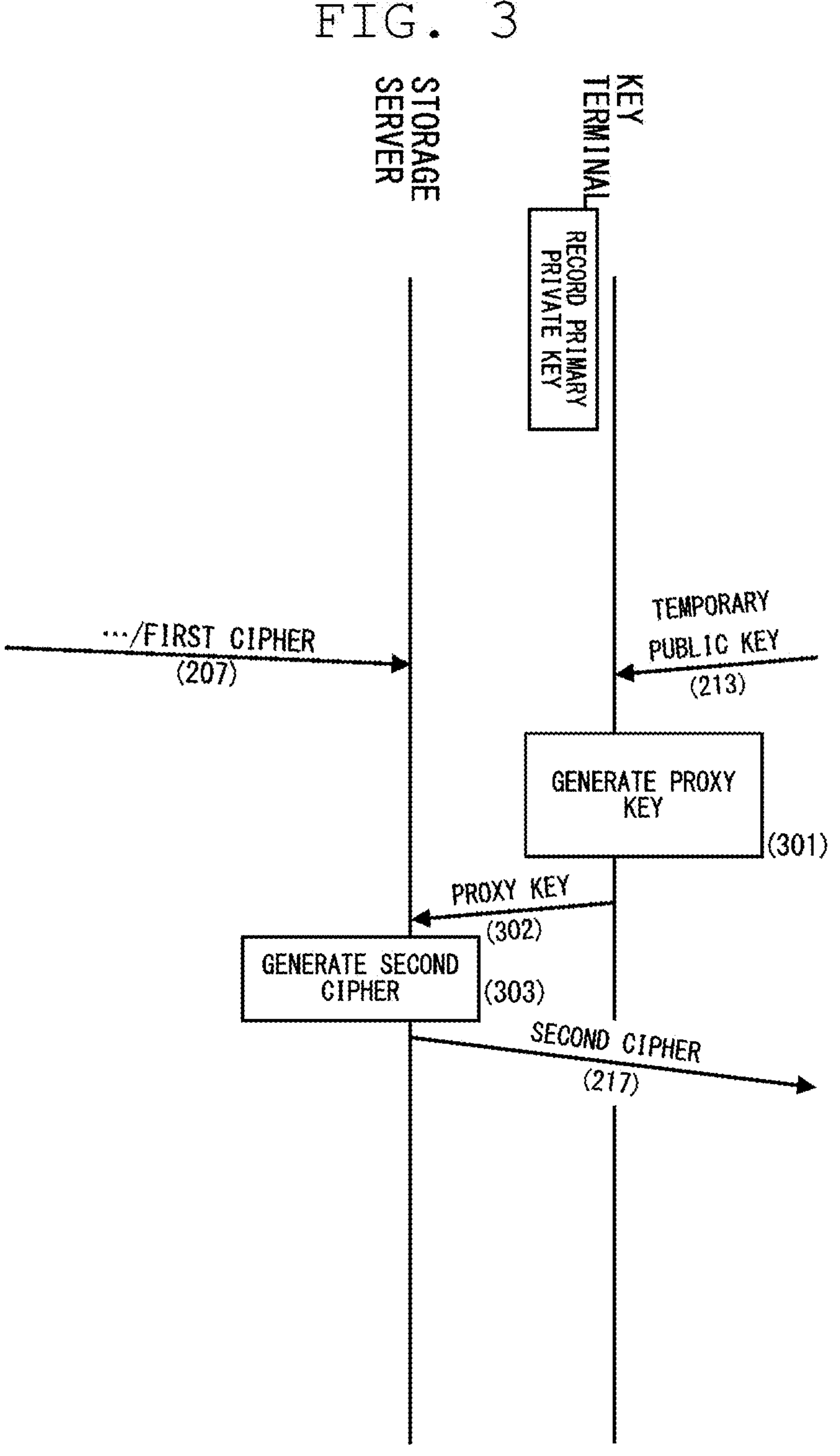
FIG. 3 is an explanatory diagram illustrating an aspect in which a key terminal and a storage server cooperate with each other by proxy encryption in the storage system of the present disclosure.

A first technique is a technique using proxy reencryption. FIG. 3 is an explanatory diagram illustrating an aspect in which the key terminal and the storage server cooperate with each other by proxy encryption in the storage system of the present disclosure. Hereinafter, a description is given with reference to FIG. 3.

First, the key terminal 141 generates a proxy key from the primary private key recorded in the key terminal 141 and the temporary public key transmitted (213) from the download terminal 121 (301), and transmits the generated proxy key to the storage server 131 (302).

Meanwhile, the storage server 131 generates a second cipher by reencrypting the first cipher stored in the storage server 131 with the proxy key transmitted (302) from the key terminal 141 (303), and transmits the generated second cipher to the download terminal 121 (217).

In this aspect, a public key encryption system that can reencrypt a cipher by a public key encryption system of a primary key pair is used when a temporary key pair is generated.

For example, as the public key encryption system of a primary key pair, the technique introduced as AFGH06 in Non Patent Literature 1 can be adopted. In the public key encryption system AFGH06, P and g are open to the public as $g=e(P, P)\in G$ in which E is an elliptic curve, P is a point on the elliptic curve, and $e: E\times E\rightarrow G$ is a symmetric pairing.

The primary private key is an integer a being randomly selected, and aP is set as the primary public key.

The temporary private key is an integer b being randomly selected, and bP is set as the temporary public key.

In encryption with the primary public key a on a message m, an integer r is randomly selected, and $c_a=(mg^r, r(aP))$ is set as a ciphertext.

In normal decryption on a ciphertext $c_a=(u, V_a)$, $u/e(V_a, (1/a)P)=mg^r/e(raP, (1/a)P)=mg^r/e(P, P)^r=mg^r/g^r=m$ is set.

A proxy key s is set as $s=(1/a)(bP)=(b/a)P$ by using the primary private key a and the temporary public key bP.

In reencryption with the proxy key s of the ciphertext $c_a=(u, V_a)$, $e(V_a, r_{a\rightarrow b})=e(raP, (b/a)P)=e(P, P)^{rb}=g^{rb}$ is calculated, and $(u,e(V_a, r_{a\rightarrow b}))=(u, g^{rb})$ is set as a ciphertext.

In order to decrypt the reencrypted ciphertext $(u, v_b)$, $u/v_b^{1/b}=mg^r/(g^{rb})^{1/b}=mg^r/g^r=m$ is set.

In this technique, the primary key pair is based on the public key encryption system on the elliptic curve, but the temporary key pair is based on the public key encryption system on a finite field, and reencryption can be performed only once.

In the present embodiment, the technique of proxy reencryption disclosed in Non Patent Literature 1, as a matter of course, and various proxy reencryption techniques can be applied. Then, generation of a primary key pair and a temporary key pair, encryption with a public key, and decryption with a private key may be performed according to the adopted technique.

Figure 4:
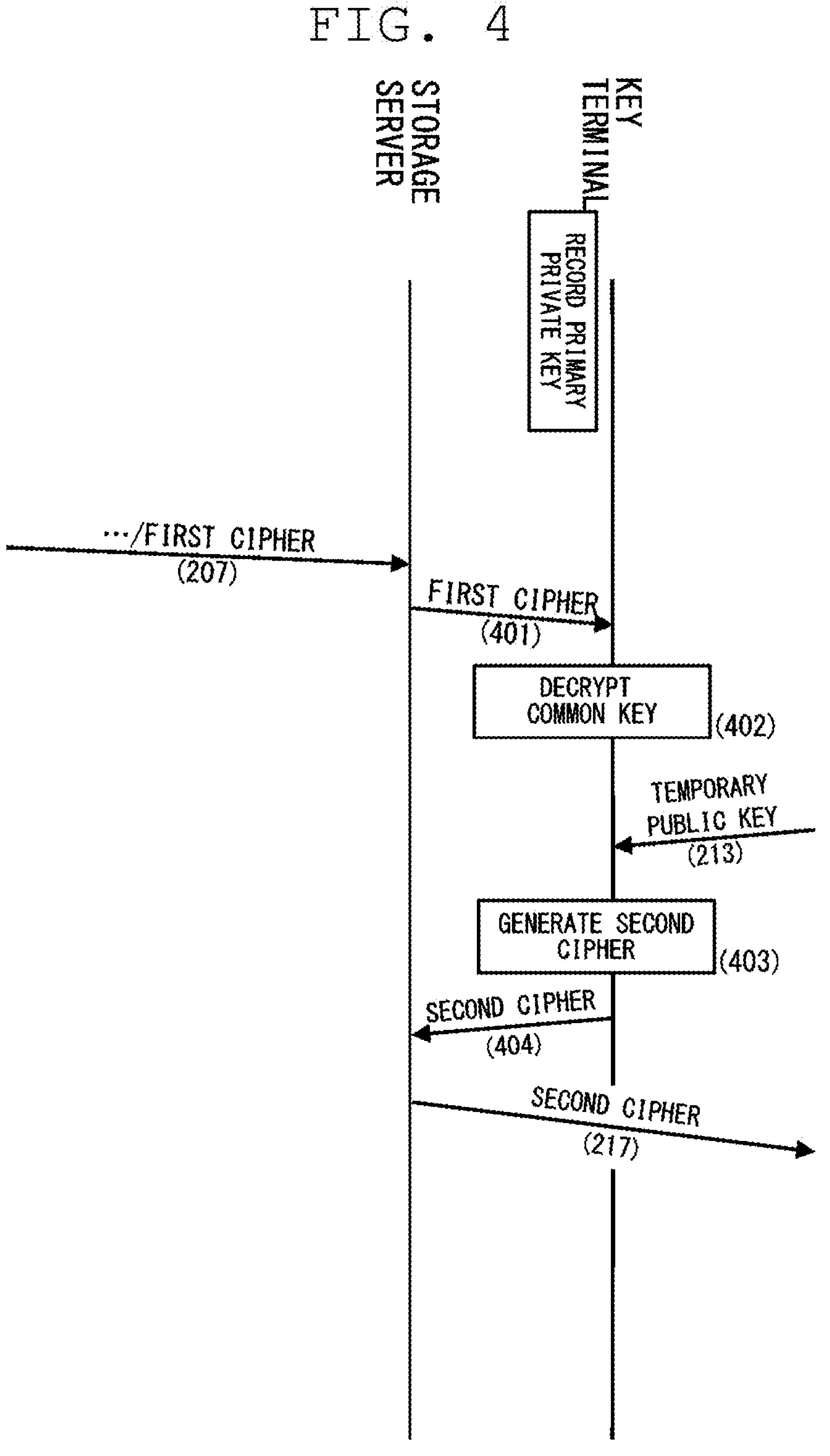
FIG. 4 is an explanatory diagram illustrating an aspect in which the key terminal and the storage server cooperate with each other by performing decryption and encryption in the key terminal in the storage system of the present disclosure.

A second technique is a technique in which decryption and encryption are performed in the key terminal 141. FIG. 4 is an explanatory diagram illustrating an aspect in which the key terminal and the storage server cooperate with each other by performing decryption and encryption in the key terminal in the storage system of the present disclosure. Hereinafter, a description is given with reference to FIG. 4.

First, the key terminal 141 acquires the first cipher stored in the storage server 131 from the storage server 131 (401).

Then, the key terminal 141 decrypts the first cipher acquired from the storage server 131 with the primary private key recorded in the key terminal 141, and acquires a shared key (402).

Furthermore, the key terminal 141 generates a second cipher by encrypting the decrypted shared key with the temporary public key transmitted from the download terminal 121 (403).

Then, the key terminal 141 transmits the generated second cipher to the download terminal 121 (217) via the storage server 131 (404). Note that the key terminal 141 may directly transmit the second cipher to the download terminal 121 without passing through the storage server 131.

In the present aspect, the second cipher is acquired by decrypting the common key from the first cipher by using the primary private key in the key terminal 141, and then encrypting the common key by using the temporary public key.

Therefore, various public key encryption systems can be used according to performance and use of an apparatus and a library with a primary key pair and a temporary key pair.

Returning to FIG. 2, and description continues. When the second cipher is transmitted (217), the download terminal 121 decrypts the shared key from the transmitted second cipher with the temporary private key secretly recorded in the download terminal 121 (218).

Then, the download terminal 121 acquires the encrypted file stored in the storage server 131 from the storage server 131 (219).

Note that the transmission of the second cipher (217) and the acquisition of the encrypted file (219) may be collectively performed.

Lastly, the download terminal 121 decrypts, with the decrypted common key, the encrypted file acquired from the storage server 131 (220), and acquires an object file (221).

Herein, a relationship among pieces of the information is organized again.

An encrypted file is acquired by encrypting an object file with a common key.

A first cipher is acquired by encrypting a common key with a primary public key.

When the first cipher is decrypted with a primary private key, the common key is acquired.

A second cipher corresponds to a cipher acquired by encrypting the common key with a temporary public key.

A proxy key is acquired from the temporary public key and the primary private key.

When the proxy key is applied to the first cipher, the second cipher is acquired while the common key is kept secret.

When the second cipher is decrypted with a temporary private key, the common key is acquired.

When the encrypted file is decrypted with the common key, the object file is acquired.

According to the present aspect, a primary private key of a download user does not leak from the key terminal 141 to the outside, and thus the primary private key can be safely managed.

Note that, in the present aspect, when a download user installs a dedicated application program in the key terminal 141 and starts using the present system, it is desirable that the key terminal 141 generates a primary key pair, and registers a primary public key in the key server 161.

However, when an upload user is to perform uploading, the download user may not have started using the present system yet.

In this case, the key server 161 performs generation of a primary key pair instead, and thus uploading by the upload user can be finished even when the download user has not started using the present system.

In other words, in a case where a public key associated with an identification name of a download user designated in an inquiry from the upload terminal 111 is not registered in the key server 161, the key server 161 generates a provisional key pair including a provisional public key and a provisional private key, registers the generated provisional public key in association with the identification, passes the provisional private key to the key terminal 141 when a user of the identification name installs an application program in the key terminal 141 and starts using the present system, and secretly records the provisional private key as a primary private key.

In this aspect, even when the download user has not started using the storage system 101, the upload user can store an encrypted file for an object file in the storage server 131. Further, when the download user starts using the storage system 101 in response to communication with the download user from the upload user, an object file can be acquired.

Note that, after the download user acquires the encrypted file from the storage server 131 and decrypts the object file, it is desirable that the download user rapidly generates a new primary key pair in the key terminal 141 and registers the primary key pair in the key server 161.

Further, at the time of installation of an application program in the key terminal 141, a new primary key pair may be immediately generated in the key terminal 141, and both of a provisional private key based on a provisional key pair and a primary private key related to the new primary key pair may also be used for a certain period after the installation.

Plural Download Users

There are public key encryption systems in which a plurality of destination users can encrypt one message into one ciphertext by using a plurality of public keys owned by each of the plurality of destination users, and each of the plurality of destination users can decrypt an original message from the one ciphertext by using his/her private key and a public key of the other destination user.

By using such a public key encryption system, one first cipher and one encrypted file for a plurality of download users to be able to acquire an object file can be prepared.

In this aspect, one first cipher is acquired from a common key that encrypts an object file into an encrypted file with a plurality of public keys owned by each of the plurality of download users.

In the key terminal 141 used by each of the download users, a primary private key owned by each of the download users is secretly recorded. Further, the key terminal 141 can acquire a primary public key owned by each of the other download users from the key server 161.

Thus, when each key terminal 141 decrypts the common key from the first cipher, encrypts the decrypted common key with a temporary public key transmitted from each download terminal 121, and sets the encrypted common key as a second cipher, processing of decrypting the encrypted file in each download terminal 121 can proceed.

A plurality of identification names of the download users may be listed, or an inquiry designating a common portion (for example, a domain name and the like) of identification names may be sent to the key server 161. When a reply regarding one or a plurality of identification names together with a public key is made, the replied identification name is an identification name of the download user, and the first cipher is generated by using the replied public key.

History of Primary Key Pairs

The key terminal 141 may record a history of primary key pairs owned by a user of the key terminal 141 in the past, and any of the primary key pairs may be able to be selected and used as necessary.

Further, this history is encrypted by an encryption method that can be decrypted in the key terminal 141, and can be then stored in the key server 161.

In a case where authentication of an owner of the key terminal 141 is performed when an application program is activated in the key terminal 141, the history may be encrypted by a "countersign" used in the authentication. As the "countersign", a password, a passphrase, an identification number, a PIN, and the like can be adopted.

In an aspect in which a random table is presented to a user, an element in the table is extracted based on an order rule assigned to the user, and authentication is performed based on whether the order rule is properly applied, encryption can be performed by a "countersign" based on the order rule.

Further, the history may be encrypted by a new public key, all public keys, a public key in which no leakage of a private key is found, a public key randomly selected from public keys in which no leakage of a private key is found, or the like in the history held in the key terminal 141, and the history may be stored in the key server 161.

By adopting such an aspect, even when the upload terminal 111 generates and sends a first cipher and an encrypted file by using a primary public key again being used and stored in the past, the key terminal 141 can generate a second cipher by acquiring, from the history, a past primary private key associated with the past primary public key and using the past primary private key, and the download terminal 121 can decrypt an object file from the encrypted file.

At this time, in order to indicate which past primary public key is used, the upload terminal 111 may store, in the storage server 131, the first cipher and the encrypted file in association with the used primary public key, an identification name assigned to the primary public key, an identification name of an owner (download user assumed by an upload user) of the primary public key, and the like.

In the key terminal 141, a corresponding primary public key is searched from the history stored in the key terminal 141 by using the information stored in the storage server 131 as a key for a search, and a primary private key associated with the primary public key can be acquired.

In an actual operation, a primary public key is considered to be unique and not to be duplicated. Thus, in an aspect in which a primary public key used for encryption by the upload terminal 111 is also stored in the storage server 131, the history can be searched by using only the primary public key as a key. However, which primary private key needs to be used can also be strictly confirmed by further checking an identification name of a primary public key and information about an owner and notifying a user of the key terminal 141 of the identification name and the information.

Further, in an aspect in which the upload terminal 111 does not store a primary public key itself in the storage server 131, but stores information such as an identification name of a primary public key and an identification name of an owner of the primary public key, whether a first cipher and an encrypted file may be downloaded can be determined by the information.

Furthermore, in an aspect in which an identification name of a download user (identification name of a primary public key) is stored together with a first cipher and an encrypted file in the storage server 131, a file that can be downloaded by the download user from the storage server 131 can be searched by an identification name of the download user when the download user signs in from the download terminal 121, a list can be generated, and the list can also be displayed on the download terminal 121. In other words, a first cipher and an encrypted file can be downloaded by only a user who owns a primary public key related to the first cipher and the encrypted file.

Plural Download Users

In the present embodiment, any number of download users can be designated and applied to an aspect in which an object file is sent.

For example, when identification names of aaa@example.com, bbb@example.com, and ccc@example.com of three download users are designated and uploaded, a first cipher encrypts a shared key with three public keys assigned to the three download users of aaa@example.com, bbb@example.com, and ccc@example.com.

The storage server 141 manages a file in such a way that only the download terminal 121 that has signed in as aaa@example.com, bbb@example.com, and ccc@example.com can acquire the first cipher and the encrypted file.

A shared key can be decrypted or reencrypted into a second cipher with a private key of the download user of aaa@example.com (and a public key of the other download users of bbb@example.com and ccc@example.com) from the first cipher on the download user aaa@example.com side. The same applies to the other download users.

When a domain of @example.com is designated as a download user, a user having the domain of @example.com is searched by using the key server 161, and a shared key is encrypted into the first cipher with public keys of all found users.

A user having an identification name that matches the domain of @example.com can acquire the first cipher and the encrypted file from the storage server 131 by using the download terminal 121. Then, the shared key can be decrypted from the first cipher or reencrypted into the second cipher by using his/her private key recorded in the key terminal 141 and a public key of the other user matching the domain.

Note that an aspect in which a domain primary key pair for the domain of @example.com is generated in the key server 161 and the key terminal 141, a domain primary public key included in the domain primary key pair for the domain of @example.com is registered in the key server 161, and the shared key is encrypted into the first cipher with the domain primary public key in the upload terminal 111 can also be adopted.

In this aspect, a domain primary private key included in the domain primary key pair may be shared as one of private keys that can be used by a user having the matched domain in the key terminal 141 used by the matched user (or a user having specific authority among the users), or the domain primary private key may be managed by only the key server 161.

In this way, the key server 161 and the key terminal 141 may cooperate with each other by using the domain primary private key being physically shared by the key terminal 141 or logically shared by the key server 161, and reencryption may be performed from a cipher with a domain public key into a cipher with a temporary public key.

As described above, in this aspect, a plurality of download users and a user matching a certain domain (or a user that can use a domain primary private key among the users) can acquire an object file.

SUMMARY

As described above, a storage system of the present embodiments may be configured as a storage system comprising:

- an upload terminal;
- a download terminal;
- a storage server; and
- a key terminal that secretly records a primary private key included together with a primary public key in a primary key pair, wherein
- (a) the upload terminal
  - generates a common key, generates an encrypted file by encrypting an object file with the generated common key, generates a first cipher by encrypting the generated common key with the primary public key, and stores the generated encrypted file and the generated first cipher in the storage server, (b) the download terminal generates a temporary key pair including a temporary public key and a temporary private key, secretly records the temporary private key, transmits the temporary public key to the key terminal, and attempts a sign-in to the storage server, (c) when the sign-in is successful, the key terminal and the storage server in cooperation with each other generate a second cipher acquired by encrypting the common key with the temporary public key from the recorded primary private key, the transmitted temporary public key, and the stored first cipher while the common key is kept secret from the storage server, and transmit the generated second cipher to the download terminal, and (e) the download terminal decrypts the shared key from the transmitted second cipher with the temporary private key, acquires the stored encrypted file from the storage server, and decrypts the object file from the acquired encrypted file with the decrypted common key.

In the storage system of the present embodiments, it may be configured that the key terminal generates a proxy key from the recorded primary private key and the transmitted temporary public key, and transmits the generated proxy key to the storage server, and the storage server generates the second cipher by reencrypting the stored first cipher with the transmitted proxy key, and transmits the generated second cipher to the download terminal.

In the storage system of the present embodiments, it may be configured that the key terminal acquires the stored first cipher from the storage server, decrypts the shared key from the first cipher with the recorded primary private key, generates the second cipher by encrypting the decrypted shared key with the transmitted temporary public key, and transmits the generated second cipher to the download terminal via the storage server.

In the storage system of the present embodiments, it may be configured that whether the sign-in is successful is determined by multi-factor authentication in which use of the key terminal is one of factors.

In the storage system of the present embodiments, it may be configured that an attempt at the sign-in to the storage server is accompanied by the temporary public key, and the key terminal acquires, from the storage server, the temporary public key accompanying the attempt at the sign-in, and thus receives the temporary public key.

In the storage system of the present embodiments, it may be configured that the download terminal displays, on a screen, a code acquired by encoding the generated temporary public key in a machine recognizable manner, and the key terminal performs scanning and machine recognition on the displayed code, and thus receives the temporary public key.

In the storage system of the present embodiments, it may be configured that an attempt at the sign-in to the storage server is accompanied by the temporary public key, the key terminal reports the temporary public key subjected to the machine recognition to the storage server, and a fact that the temporary public key accompanying the attempt at the sign-in and the temporary public key reported from the key terminal coincide with each other is set as a necessary condition for success in the sign-in.

In the storage system of the present embodiments, it may be configured that the key terminal provides an electronic signature with the recorded primary private key to the temporary public key subjected to the machine recognition, and reports the temporary public key together with the electronic signature to the storage server, the storage server verifies the reported electronic signature with the primary public key, and a fact that the verification is successful is set as a necessary condition for success in the sign-in.

In the storage system of the present embodiments, it may be configured that the upload terminal and the download terminal are achieved by the same computer used by a key owner who owns the primary key pair, and the storage system is configured to back up and restore the object file by the key owner.

In the storage system of the present embodiments, it may be configured that the upload terminal is achieved by a computer used by a file owner who owns the object file, the download terminal is achieved by another computer used by a key owner who owns the primary key pair, and the storage system is configured to transmit the object file from the file owner to the key owner.

A storage method of the present embodiments may be configured as a storage method to be executed by an upload terminal, a download terminal, a storage server, and a key terminal that secretly records a primary private key included together with a primary public key in a primary key pair, the storage method comprising:

(a) by the upload terminal, generating a common key;

generating an encrypted file by encrypting an object file with the generated common key;

generating a first cipher by encrypting the generated common key with the primary public key; and storing the generated encrypted file and the generated first cipher in the storage server;

(b) by the download terminal, generating a temporary key pair including a temporary public key and a temporary private key;

secretly recording the temporary private key;

transmitting the temporary public key to the key terminal; and attempting a sign-in to the storage server;

(c) when the sign-in is successful, by the key terminal and the storage server in cooperation with each other, generating a second cipher acquired by encrypting the common key with the temporary public key from the recorded primary private key, the transmitted temporary public key, and the stored first cipher while the common key is kept secret from the storage server; and transmitting the generated second cipher to the download terminal; and (e) by the download terminal, decrypting the shared key from the transmitted second cipher with the temporary private key;

acquiring the stored encrypted file from the storage server; and decrypting the object file from the acquired encrypted file with the decrypted common key.

A system program of the present embodiments may be configured as a system program comprising:

an upload program executed in an upload terminal;

a download program executed in a download terminal;

a storage program executed in a storage server; and a key program executed in a key terminal that secretly records a primary private key included together with a primary public key in a primary key pair, wherein (a) the upload program causes the upload terminal to execute processing of generating a common key, generating an encrypted file by encrypting an object file with the generated common key, generating a first cipher by encrypting the generated common key with the primary public key, and storing the generated encrypted file and the generated first cipher in the storage server, (b) the download program causes the download terminal to execute processing of generating a temporary key pair including a temporary public key and a temporary private key, secretly recording the temporary private key, transmitting the temporary public key to the key terminal, and attempting a sign-in to the storage server, (c) when the sign-in is successful, the key program and the storage program respectively cause the key terminal and the storage server in cooperation with each other to execute processing of generating a second cipher acquired by encrypting the common key with the temporary public key from the recorded primary private key, the transmitted temporary public key, and the stored first cipher while the common key is kept secret from the storage server, and transmitting the generated second cipher to the download terminal, and (e) the download program causes the download terminal to execute processing of decrypting the shared key from the transmitted second cipher with the temporary private key, acquiring the stored encrypted file from the storage server, and decrypting the object file from the acquired encrypted file with the decrypted common key.

A non-transitory computer-readable information recording medium of the present embodiments may be configured as a non-transitory computer-readable information recording medium recording at least one of the upload program, the download program, the key program, and the storage program described above.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure can provide a storage system for processing an encrypted file while a private key is kept secret in a key terminal.

REFERENCE SIGNS LIST

101 Storage system
111 Upload terminal
121 Download terminal
131 Storage server
141 Key terminal
151 Computer communication network
161 Key server

The invention claimed is:

1. A storage system comprising:

an upload terminal;

a download terminal;

a storage server; and a key terminal that secretly records a primary private key included together with a primary public key in a primary key pair, wherein (a) the upload terminal generates a common key, generates an encrypted file by encrypting an object file with the generated common key, generates a first cipher by encrypting the generated common key with the primary public key, and stores the generated encrypted file and the generated first cipher in the storage server, (b) the download terminal generates a temporary key pair including a temporary public key and a temporary private key, secretly records the temporary private key, transmits the temporary public key to the key terminal, and attempts a sign-in to the storage server, (c) when the sign-in is successful, the key terminal and the storage server in cooperation with each other generate a second cipher acquired by encrypting the common key with the temporary public key from the recorded primary private key, the transmitted temporary public key, and the stored first cipher while the common key is kept secret from the storage server, and transmit the generated second cipher to the download terminal, and (d) the download terminal decrypts the common key from the transmitted second cipher with the temporary private key, acquires the stored encrypted file from the storage server, and decrypts the object file from the acquired encrypted file with the decrypted common key.

2. The storage system according to claim 1, wherein the key terminal generates a proxy key from the recorded primary private key and the transmitted temporary public key, and transmits the generated proxy key to the storage server, and the storage server generates the second cipher by reencrypting the stored first cipher with the transmitted proxy key, and transmits the generated second cipher to the download terminal.

3. The storage system according to claim 1, wherein the key terminal acquires the stored first cipher from the storage server, decrypts the common key from the first cipher with the recorded primary private key, generates the second cipher by encrypting the decrypted common key with the transmitted temporary public key, and transmits the generated second cipher to the download terminal via the storage server.

4. The storage system according to claim 3, wherein whether the sign-in is successful is determined by multi-factor authentication in which use of the key terminal is one of factors.

5. The storage system according to claim 4, wherein an attempt at the sign-in to the storage server is accompanied by the temporary public key, and the key terminal acquires, from the storage server, the temporary public key accompanying the attempt at the sign-in, and thus receives the temporary public key.

6. The storage system according to claim 4, wherein the download terminal displays, on a screen, a code acquired by encoding the generated temporary public key in a machine recognizable manner, and the key terminal performs scanning and machine recognition on the displayed code, and thus receives the temporary public key.

7. The storage system according to claim 6, wherein an attempt at the sign-in to the storage server is accompanied by the temporary public key, the key terminal reports the temporary public key subjected to the machine recognition to the storage server, and a fact that the temporary public key accompanying the attempt at the sign-in and the temporary public key reported from the key terminal coincide with each other is set as a necessary condition for success in the sign-in.

8. The storage system according to claim 7, wherein the key terminal provides an electronic signature with the recorded primary private key to the temporary public key subjected to the machine recognition, and reports the temporary public key together with the electronic signature to the storage server, the storage server verifies the reported electronic signature with the primary public key, and a fact that the verification is successful is set as a necessary condition for success in the sign-in.

9. The storage system according to claim 1, wherein the upload terminal and the download terminal are achieved by the same computer used by a key owner who owns the primary key pair, and the storage system is configured to back up and restore the object file by the key owner.

10. The storage system according to claim 1, wherein the upload terminal is achieved by a computer used by a file owner who owns the object file, the download terminal is achieved by another computer used by a key owner who owns the primary key pair, and the storage system is configured to transmit the object file from the file owner to the key owner.

11. A storage method to be executed by an upload terminal, a download terminal, a storage server, and a key terminal that secretly records a primary private key included together with a primary public key in a primary key pair, the storage method comprising:

(a) by the upload terminal, generating a common key;

generating an encrypted file by encrypting an object file with the generated common key;

generating a first cipher by encrypting the generated common key with the primary public key; and storing the generated encrypted file and the generated first cipher in the storage server;

(b) by the download terminal, generating a temporary key pair including a temporary public key and a temporary private key;

secretly recording the temporary private key;

transmitting the temporary public key to the key terminal; and attempting a sign-in to the storage server;

(c) when the sign-in is successful, by the key terminal and the storage server in cooperation with each other, generating a second cipher acquired by encrypting the common key with the temporary public key from the recorded primary private key, the transmitted temporary public key, and the stored first cipher while the common key is kept secret from the storage server; and transmitting the generated second cipher to the download terminal; and (d) by the download terminal, decrypting the common key from the transmitted second cipher with the temporary private key;

acquiring the stored encrypted file from the storage server; and decrypting the object file from the acquired encrypted file with the decrypted common key.

12. A non-transitory computer-readable information recording medium recording at least one of a upload program, a download program, a key program, and a storage program comprising:

the upload program executed in an upload terminal;

the download program executed in a download terminal;

the storage program executed in a storage server; and the key program executed in a key terminal that secretly records a primary private key included together with a primary public key in a primary key pair, wherein (a) the upload program causes the upload terminal to execute processing of generating a common key, generating an encrypted file by encrypting an object file with the generated common key, generating a first cipher by encrypting the generated common key with the primary public key, and storing the generated encrypted file and the generated first cipher in the storage server, (b) the download program causes the download terminal to execute processing of generating a temporary key pair including a temporary public key and a temporary private key, secretly recording the temporary private key, transmitting the temporary public key to the key terminal, and attempting a sign-in to the storage server, (c) when the sign-in is successful, the key program and the storage program respectively cause the key terminal and the storage server in cooperation with each other to execute processing of generating a second cipher acquired by encrypting the common key with the temporary public key from the recorded primary private key, the transmitted temporary public key, and the stored first cipher while the common key is kept secret from the storage server, and transmitting the generated second cipher to the download terminal, and (d) the download program causes the download terminal to execute processing of decrypting the common key from the transmitted second cipher with the temporary private key, acquiring the stored encrypted file from the storage server, and decrypting the object file from the acquired encrypted file with the decrypted common key.

* * * * *